United States Patent
Rivers et al.

(10) Patent No.: US 6,723,249 B2
(45) Date of Patent: Apr. 20, 2004

(54) DETOXIFICATION OF ONIUM COMPOUNDS

(75) Inventors: Gordon T. Rivers, Houston, TX (US); Hartley H. Downs, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 199 days.

(21) Appl. No.: 10/029,187

(22) Filed: Dec. 18, 2001

(65) Prior Publication Data

US 2003/0116507 A1 Jun. 26, 2003

(51) Int. Cl.$^7$ .................................................. C02F 1/00
(52) U.S. Cl. ...................... 210/727; 210/729; 210/732; 210/733; 210/749; 210/908; 210/909
(58) Field of Search ................................. 210/727, 728, 210/729, 732, 733, 749, 908, 909

(56) References Cited

U.S. PATENT DOCUMENTS

| | | | |
|---|---|---|---|
| 4,204,954 A | 5/1980 | Jacob | |
| 5,169,536 A | 12/1992 | Vasconcellos et al. | |
| 5,486,296 A | 1/1996 | Petrille, III et al. | |
| 5,518,636 A * | 5/1996 | Petrille et al. | 210/749 |
| 6,620,330 B2 * | 9/2003 | Rivers et al. | 210/749 |

FOREIGN PATENT DOCUMENTS

| | | |
|---|---|---|
| DE | 41 01 336 A1 | 7/1992 |
| EP | 0 093 320 A2 | 11/1983 |
| EP | 0351 688 A1 | 1/1990 |
| EP | 0 435 014 A1 | 7/1991 |
| EP | 0 579 336 A1 | 1/1994 |
| WO | WO 01/38695 A2 | 5/2001 |

OTHER PUBLICATIONS

PCT ISA/EP Search Report for Application No. PCT/US02/39760, May 6, 2003.

G. A. Cary, et al., "The Effect of Suspended Solids and Naturally Occurring Dissolved Organics in Reducing the Acute Toxicities of Cationic Polyetectrolytes to Aquatic Organisms," Environmental Toxicology and Chemistry, vol. 6, pp. 469–474, 1987.

* cited by examiner

*Primary Examiner*—Peter A. Hruskoci
(74) *Attorney, Agent, or Firm*—Madan, Mossman & Sriram, P.C.

(57) ABSTRACT

A method for reducing the toxicity of onium compounds, such as ammonium compounds and phosphonium compounds, by the use of certain additives is described. Suitable additives include, but are not necessarily limited to, carboxylic acids (e.g. naphthenic acids), sulfonic acids, organophosphonic acids, phenolic compounds, ether sulfates, phosphoric acid esters, sulfonated fatty acids, sulfated fatty acids, oligocarboxylic acids, and mixtures thereof, and alkali metal salts of these compounds and amine salts of these compounds.

10 Claims, No Drawings

DETOXIFICATION OF ONIUM COMPOUNDS

FIELD OF THE INVENTION

The invention relates to methods and compositions for detoxifying aqueous solutions of onium compounds, and, in one aspect, more particularly relates to methods and compositions for detoxifying aqueous solutions of onium compounds where the treated onium compounds partition into a non-aqueous phase.

BACKGROUND OF THE INVENTION

It is well known that onium compounds, particularly quaternary ammonium compounds such as quaternary ammonium salts, have found widespread use in a number of applications including, but not necessarily limited to, disinfectants, cleansers and sterilizers, cosmetics (deodorants, dandruff removers, emulsion stabilizers), fungicides, mildew preventatives, antistatic additives, biocides, gas hydrate inhibitors, to increase the affinity of dyes for photographic film, to improve dispersibility in the coatings of pigment particles, to increase adhesion of road dressings and paints, etc. Because onium compounds function as biocides whether or not this is their originally intended purpose, the residual onium compounds when discharged into waste water streams after use will interfere in the biological treatment processes by inhibiting the growth of biomass. Additionally, in situations such as discharging used water directly into the environment, such as into seawater, the discharge of water containing onium compounds may be restricted due to regulations pertaining to the toxicity of such water to marine organisms.

U.S. Pat. No. 4,204,954 concerns the detoxification of residues of quaternary ammonium salt biocides in water using neutralizing amounts of certain anionic monomers.

There remains a need for new compositions for detoxifying aqueous solutions containing onium compounds prior to discharge or wastewater treatment with biomass.

SUMMARY OF THE INVENTION

Accordingly, it is an object of the present invention to provide compositions of matter that will reduce the toxicity of aqueous solutions containing onium compounds.

It is another object of the present invention to provide a method for reducing the toxicity of aqueous solutions containing onium compounds that can be readily implemented.

It is yet another object of the invention to provide methods and compositions for detoxifying aqueous solutions containing onium compounds that do not form solids and do not foul conduits and processes downstream of the area where the effective anionic polymers are added.

In carrying out these and other objects of the invention, there is provided, in one form, a method of reducing the toxicity of at least one onium compound in an aqueous solution that involves adding to the aqueous solution an additive in an amount sufficient to reduce the toxicity of the onium compound. The treated onium compound partitions into a non-aqueous phase. The method also involves removing the non-aqueous phase from the aqueous solution. The additive may be a compound including one or more aromatic carboxylic acids, sulfonic acids, organophosphonic acids, phenolic compounds, ether sulfates, phosphoric acid esters, sulfonated fatty acids, sulfated fatty acids, oligocarboxylic acids, and mixtures thereof. Alkali metal salts of these compounds and amine salts of these compounds are also acceptable additives. A separate non-aqueous phase may be added to the aqueous solution either before, during or after the additive is introduced to facilitate separation of the treated onium compound from the aqueous solution.

DETAILED DESCRIPTION OF THE INVENTION

It has been discovered that onium compounds and the additives of this invention interact or form complexes or ion pair that reduces the toxicity of the aqueous solution where the onium compounds are present. The invention relates to methods and compositions for inhibiting, reducing, retarding, mitigating, controlling and minimizing the toxicity of aqueous solutions or otherwise pure water containing onium compounds. While it may be possible for the methods and compositions of this invention to completely remove, eliminate, eradicate and/or abolish any toxic effects of the onium compounds in the aqueous solutions or water, it will be appreciated that any reduction, retardation, mitigation, control, and minimization of any toxic effect of the solutions or water using the compositions and methods of this invention is considered a successful accomplishment or achievement of the intended goals and purposes of the invention. Further, the invention is not limited to any particular mechanism or explanation as to why the particular additives work to separate the onium compounds from aqueous solutions, even though in one non-limiting embodiment there is some thought that the additives complex or form pairs with the onium compounds. The net result is to reduce the concentration of the onium compound in the aqueous solution upon discharge to the environment and thus reduce the toxicity of the aqueous stream.

It will further be appreciated that the term "aqueous solutions" refer to any aqueous solution and includes, but is not limited to, solutions where the only other compound besides the onium compound is pure water "Aqueous solutions" include, but are not necessarily limited to brines, water-in-oil emulsions, oil-in-water emulsions, suspensions, and other combinations of hydrocarbons and water, and include mixtures where gas may be present.

The methods and compositions of this invention are not necessarily limited to the particular nature of the aqueous solutions or water treated, but may be applied to any aqueous solutions or water containing onium compounds, including but not necessarily limited to, aqueous solutions obtained from oil and gas production, for example those treated with onium compounds to inhibit gas hydrates from forming, aqueous solutions containing onium compounds as biocides, aqueous solutions containing onium compounds used as fungicides, aqueous solutions containing onium compounds used as disinfectants, cleansers and sterilizers and the like, etc.

The method of the present invention involves contacting a suitable aqueous solution containing at least one onium compound with an effective amount of an inventive additive to reduce the toxicity of the aqueous solution, where the aqueous solution containing at least one onium compound under the same conditions exhibits some toxic effects to at least one species.

The contacting may be achieved by a number ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition in the mixture. The contacting can be made in-line or offline or both. The contacting may be accomplished simply by injecting the anionic polymer into the aqueous solution. There are no temperature or pressure conditions or restrictions upon the contacting. The aqueous solution may have a non-aqueous phase mixed therewith such as an oil-in-water or water-in-oil emulsion that may be partially or substantially resolved or not resolved at all. As noted, a non-aqueous phase may be added to the aqueous solution before, during or after the additive is introduced to facilitate the remove of the treated onium species in the non-aqueous phase. Formulating the onium compound and the anionic additive together allows quat hydrate inhibitor (e.g.) and the anionic detoxification agent to be applied to a system (e.g. producing oil and/or gas) as a single package and does not require separate injection points. Such mixing of the separate non-aqueous phase may be accomplished by any of the contacting techniques described above. However, in another embodiment of the invention, it may be preferred to use several, separate injection points.

Suitable onium compounds for use in the composition for the present invention are defined to have a general structure of the following formula A having a cation with a center atom X and an anion Y⁻:

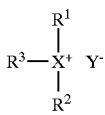

A wherein
  $R^1$ and $R^2$ each are independently selected from normal or branched alkyls containing a chain of at least 4 carbon atoms, with or without one or more substituents, or one or more heteroatoms;
  $R^3$ is an organic moiety containing a chain of at least 4 carbon atoms, with or without one or more substituents, or one or more heteroatoms;
  X is S, N—$R^4$ or P—$R^4$;
  $R^4$, if present, is selected from H or an alkyl, aryl, alkylaryl, alkenylaryl or alkenyl groups preferably those having from about 1 to about 20 carbon atoms, with or without one or more substituents, or one or more heteroatoms; and
  $Y^-$ is selected from the group consisting of hydroxide ion (OH⁻), halide ions such as Br⁻ and Cl⁻, carboxylate ions, such as benzoate ($C_6H_5COO^-$), sulfate ion ($SO_4^-$), organic sulfonate ions, such as 4-toluene sulfonate and $CH_3SO_3^-$, and the like and mixtures thereof.

Ammonium and phosphonium compounds of the above formula may also be bound through $R^4$ to become pendant groups of a number of oxygen-containing polymers. Suitable oxygen-containing polymers include, but are not limited to polyacrylic acid, polymethacrylic acid, copolymers of acrylic and methacrylic acids, and polymers or co-polymers of poly-N-vinyl-2-pyrrolidone.

Alkyl ammonium and alkyl phosphonium compounds are preferred onium compounds for the composition of the present invention when $R^4$ is H or any alkyl or alkenyl group. In these preferred onium compounds, $R^3$ can be optionally selected from the group consisting of —(CH₂CHR⁵—O—)ₙH and —(CH₂CH₂NH—)ₘH, wherein $R^5$ is H or methyl; n is an integer from about 5 to about 50; and m is an integer from 1 to about 5. Ammonium and phosphonium compounds are quaternary onium compounds.

Examples of preferred cation moiety for the onium compounds include, but are not limited to, tetrapentylammonium, tripentylbutylammonium, triisopentylbutylammonium, tripentyldecylammonium, triisopentylammonium, tributyloctadecylammonium, tetrabutylphosphonium, tributyl(9-octadecenyl) phosphonium ions and mixtures thereof.

In accordance with formula A, examples of onium compounds include, but are not limited to, tributyldecylammonium, tributylundecylammonium, tributyldodecylammonium, tributyltridecylammonium, tributyltetradecylammonium, tributylpentadecylammonium, tributylhexadecylammonium, tributylheptadecylammonium, tributyloctadecylammonium, tributylnonadecylammonium, tripentyldecylammonium, tripentylundecylammonium, tripentyldodecylammonium, tripentyltridecylammonium, tripentyltetradecylammonium, tripentylpentadecylammonium, tripentylhexadecylammonium, tripentylheptadecylammonium, tripentyloctadecylammonium, tripentylnonadecylammonium, propyldibutyldecylammonium, propyldibutylundecylammonium, propyldibutyldodecylammonium, propyldibutyltridecylammonium, propyldibutyltetradecylammonium, propyldibutylpentadecylammonium, propyldibutylhexadecylammonium, propyldibutylheptadecylammonium, propyldibutyloctadecylammonium, propyldibutylnonadecylammonium, allyldibutyldecylammonium, allyldibutylundecylammonium, allyldibutyldodecylammonium, allyldibutyltridecylammonium, allyldibutyltetradecylammonium, allyldibutylpentadecylammonium, allyldibutylhexadecylammonium, allyldibutylheptadecylammonium, allyldibutyloctadecylammonium, allyldibutylnonadecylammonium, methallyldibutyldecylammonium, methallyldibutylundecylammonium, methallyldibutyldodecylammonium, methallyldibutyltridecylammonium, methallyldibutyltetradecylammonium, methallyldibutylpentadecylammonium, methallyldibutylhexadecylammonium, methallyldibutylheptadecylammonium, methallyldibutyloctadecylammonium, methallyldibutylnonadecylammonium, dibutyldidecylammonium, dibutyldiundecylammonium, dibutyldidodecylammonium, dibutylditridecylammonium, dibutylditetradecylammonium, dibutyldipentadecylammonium, dibutyldihexadecylammonium, dibutyldiheptadecylammonium, dibutyldioctadecylammonium and dibutyldinonadecylammonium salts, and mixtures thereof Additional preferred "onium" compounds include the phosphonium compounds corresponding to above ammonium compounds. These "onium" compounds include, but are not limited to tributyldecylphosphonium, tributylundecylphosphonium, tributyldodecylphosphonium, tributyltridecylphosphonium, tributyltetradecylphosphonium, tributylpentadecylphosphonium, tributylhexadecylphosphonium,
tributylheptadecylphosphonium,
tributyloctaydecylphosphonium,
tributylnonadecylphosphonium,
tripentyldecylphosphonium, tripentylundecylphosphonium,
tripentyldodecylphosphonium,
tripentyltridecylphosphonium,
tripentyltetradecylphosphonium,
tripentylpentadecylphosphonium,
tripentylhexadecylphosphonium,
tripentylheptadecylphosphonium,
tripentyloctadecylphosphonium,
tripentylnonadecylphosphonium,
propyldibutyldecylphosphonium,
propyldibutylundecylphosphonium,
propyldibutyldodecylphosphonium,
propyldibutyltridecylphosphonium,
propyldibutyltetradecylphosphonium,
propyldibutylpentadecylphosphonium,
propyldibutylhexadecylphosphonium,
propyldibutylheptadecylphosphonium,
propyldibutyloctadecylphosphonium,
propyldibutylnonadecylphosphonium,
allyldibutyldecylphosphonium,
allyldibutylundecylphosphonium,
allyldibutyldodecylphosphonium,
allyldibutyltridecylphosphonium,
allyldibutyltetradecylphosphonium,
allyldibutylpentadecylphosphonium,
allyldibutyhexadecylphosphonium,
allyldibutylheptadecylphosphonium,
allyldibutyloctadecylphosphonium,
allyldibutylnonadecylphosphonium,
methallyldibutyldecylphosphonium,
methallyldibutylundecylphosphonium,
methallyldibutyldodecylphosphonium,
methallyldibutyltridecylphosphonium,
methallyldibutyltetradecylphosphonium,
methallyldibutylpentadecylphosphonium,
methallyldibutylhexadecylphosphonium,
methallyldibutylheptadecylphosphonium,
methallyldibutyloctadecylphosphonium,
methallyldibutylnonadecylphosphonium,
dibutyldidecylphosphonium,
dibutyldiundecylphosphonium,
dibutyldidodecylphosphonium,
dibutylditridecylphosphonium,
dibutylditetradecylphosphonium,
dibutyldipentadecylphosphonium,
dibutyldihexadecylphosphonium,
dibutyldiheptadecylphosphonium, dibutyldioctadecylphosphonium and dibutyldinonadecylphosphonium salts and mixtures thereof.

Also preferred for the present invention are onium compounds wherein zero to five of the $CH_2$ groups in the longest chains of the onium compound are replaced with one or more of the following groups $CHCH_3$, CHOH, O, C=O. Thus the onium compound may contain methyl groups, hydroxyl groups, ether groups or linkages, ester groups or linkages, and/or ketone groups. One advantage of such materials is that oxygen atoms in the chains when present, can improve the biodegradability of the onium compounds. Also, two adjacent $CH_2$ groups in the longest chains of the onium compound may be replaced with a CH=CH group such that the onium compound may contain one or more carbon to carbon double bonds. The "onium" compounds are named after the parent hydrocarbon and the replacement group(s) in the longest chain are then stated. Thus

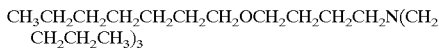

is referred to as tributyldodecylammonium where C5 is replaced with O.

Examples of onium compounds where $CH_2$ groups in the longest chains are replaced with $CHCH_3$, CHOH, O, C=O, or CH=CH groups include but are not limited to:
tributyldecylammonium, tributylundecylammonium, tributyldodecylammonium, tributyltridecylammonium,
tributyltetradecylammonium,
tributylpentadecylammonium,
tributylhexadecylammonium,
tributylheptadecylammonium,
tributyloctadecylammonium,
tributylnonadecylammonium,
tripentyldecylammonium, tripentylundecylammonium,
tripentyldodecylammonium,
tripentyltridecylammonium,
tripentyltetradecylammonium,
tripentylpentadecylammonium,
tripentylhexadecylammonium,
tripentylheptadecylammonium,
tripentyloctadecylammonium,
tripentylnonadecylammonium,
propyldibutyldecylammonium,
propyldibutylundecylammonium,
propyldibutyldodecylammonium,
propyldibutyltridecylammonium,
propyldibutyltetradecylammonium,
propyldibutylpentadecylammonium,
propyldibutylhexadecylammonium,
propyldibutylheptadecylammonium,
propyldibutyloctadecylammonium,
propyldibutylnonadecylammonium,
allyldibutyldecylammonium,
allyldibutylundecylammonium,
allyldibutyldodecylammonium, allyldibutyltridecylammonium, allyldibutyltetradecylammonium,
allyldibutylpentadecylammonium,
allyldibutylhexadecylammonium,
allyldibutylheptadecylammonium,
allyldibutyloctadecylammonium,
allyldibutylnonadecylammonium,
methallyldibutyldecylammonium,
methallyldibutylundecylammonium,
methallyldibutyldodecylammonium,
methallyldibutyltridecylammonium,
methallyldibutyltetradecylammonium,
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium,
dibutylditridecylammonium,
dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C2 is replaced with CHOH and C4 is replaced with O;

tributyldecylammonium, tributylundecylammonium, tributyldodecylammonium, tributyltridecylammonium, tributyltetradecylammonium, tributylpentadecylammonium, tributylhexadecylammonium, tributylheptadecylammonium, tributyloctadecylammonium, tributylnonadecylammonium, tripentyldecylammonium, tripentylundecylammonium, tripentyldodecylammonium, tripentyltridecylammonium, tripentyltetradecylammonium, tripentylpentadecylammonium, tripentylhexadecylammonium, tripentylheptadecylammonium, tripentyloctadecylammonium, tripentylnonadecylammonium, propyldibutyldecylammonium, propyldibutylundecylammonium, propyldibutyldodecylammonium, propyldibutyltridecylammonium, propyldibutyltetradecylammonium, propyldibutylpentadecylammonium, propyldibutylhexadecylammonium, propyldibutylheptadecylammonium, propyldibutyloctadecylammonium, propyldibutylnonadecylammonium, allyldibutyldecylammonium, allyldibutylundecylammonium, allyldibutyldodecylammonium, allyldibutyltridecylammonium, allyldibutyltetradecylammonium, allyldibutylpentadecylammonium, allyldibutylhexadecylammonium, allyldibutylheptadecylammonium, allyldibutyloctadecylammonium, allyldibutylnonadecylammonium, methallyldibutyldecylammonium, methallyldibutylundecylammonium, methallyldibutyldodecylammonium, methallyldibutyltridecylammonium, methallyldibutyltetradecylammonium, methallyldibutylpentadecylammonium, methallyldibutylhexadecylammonium, methallyldibutylheptadecylammonium, methallyldibutyloctadecylammonium, methallyldibutylnonadecylammonium, dibutyldidecylammonium, dibutyldiundecylammonium, dibutyldidodecylammonium, dibutylditridecylammonium, dibutylditetradecylammonium, dibutyldipentadecylammonium, dibutyldihexadecylammonium, dibutyldiheptadecylammonium, dibutyldioctadecylammonium and dibutyldinonadecylammonium salts where C2 is replaced with CHCH₃, C3 is replaced with O and C4 is replaced with C=O;

tributyldecylammonium, tributylundecylammonium, tributyldodecylammonium, tributyltridecylammonium, tributyltetradecylammonium, tributylpentadecylammonium, tributylhexadecylammonium, tributylheptadecylammonium, tributyloctadecylammonium, tributylnonadecylammonium, tripentyldecylammonium, tripentylundecylammonium, tripentyldodecylammonium, tripentyltridecylammonium, tripentyltetradecylammonium, tripentylpentadecylammonium, tripentylhexadecylammonium, tripentylheptadecylammonium, tripentyloctadecylammonium, tripentylnonadecylammonium, propyldibutyldecylammonium, propyldibutylundecylammonium, propyldibutyldodecylammonium, propyldibutyltridecylammonium, propyldibutyltetradecylammonium, propyldibutylpentadecylammonium, propyldibutylhexadecylammonium, propyldibutylheptadecylammonium, propyldibutyloctadecylammonium, propyldibutylnonadecylammonium, allyldibutyldecylammonium, allyldibutylundecylammonium, allyldibutyldodecylammonium, allyldibutyltridecylammonium, allyldibutyltetradecylammonium, allyldibutylpentadecylammonium, allyldibutyhexadecylammonium, allyldibutylheptadecylammonium, allyldibutyloctadecylammonium, allyldibutylnonadecylammonium, methallyldibutyldecylammonium, methallyldibutylundecylammonium, methallyldibutyldodecylammonium, methallyldibutyltridecylammonium, methallyldibutyltetradecylammonium, methallyldibutylpentadecylammonium, methallyldibutylhexadecylammonium, methallyldibutylheptadecylammonium, methallyldibutyloctadecylammonium, methallyldibutylnonadecylammonium, dibutyldidecylammonium, dibutyldiundecylammonium, dibutyldidodecylammonium, dibutylditridecylammonium, dibutylditetradecylammonium, dibutyldipentadecylammonium, dibutyldihexadecylammonium, dibutyldiheptadecylammonium, dibutyldioctadecylammonium and dibutyldinonadecylammonium salts where C3 is replaced with O and C4 is replaced with C=O;

tributyldecylammonium, tributylundecylammonium, tributyldodecylammonium, tributyltridecylammonium, tributyltetradecylammonium, tributylpentadecylammonium, tributylhexadecylammonium, tributylheptadecylammonium, tributyloctadecylammonium, tributylnonadecylammonium, tripentyldecylammonium, tripentylundecylammonium, tripentyldodecylammonium, tripentyltridecylammonium, tripentyltetradecylammonium, tripentylpentadecylammonium, tripentylhexadecylammonium, tripentylheptadecylammonium, tripentyloctadecylammonium, tripentylnonadecylammonium, propyldibutyldecylammonium, propyldibutylundecylammonium, propyldibutyldodecylammonium,
propyldibutyltridecylammonium,
propyldibutyltetradecylammonium,
propyldibutylpentadecylammonium,
propyldibutylhexadecylammonium,
propyldibutylheptadecylammonium,
propyldibutyloctadecylammonium,
propyldibutylnonadecylammonium,
allyldibutyldecylammonium,
allyldibutylundecylammonium,
allyldibutyldodecylammonium,
allyldibutyltridecylammonium,
allyldibutyltetradecylammonium,
allyldibutylpentadecylammonium,
allyldibutyhexadecylammonium,
allyldibutylheptadecylammonium,
allyldibutyloctadecylammonium,
allyldibutylnonadecylammonium,
methallyldibutyldecylammonium,
methallyldibutylundecylammonium,
methallyldibutyldodecylammonium,
methallyldibutyltridecylammonium,
methallyldibutyltetradecylammonium,
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium,
dibutylditridecylammonium,
dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C3 is replaced with O;

tributyldecylammonium, tributylundecylammonium, tributyldodecylammonium, tributyltridecylammonium,
tributyltetradecylammonium,
tributylpentadecylammonium,
tributylhexadecylammonium,
tributylheptadecylammonium,
tributyloctadecylammonium,
tributylnonadecylammonium,
tripentyldecylammonium, tripentylundecylammonium,
tripentyldodecylammonium,
tripentyltridecylammonium,
tripentyltetradecylammonium,
tripentylpentadecylammonium,
tripentylhexadecylammonium,
tripentylheptadecylammonium,
tripentyloctadecylammonium,
tripentylnonadecylammonium,
propyldibutyldecylammonium,
propyldibutylundecylammonium,
propyldibutyldodecylammonium,
propyldibutyltridecylammonium,
propyldibutyltetradecylammonium,
propyldibutylpentadecylammonium,
propyldibutylhexadecylammonium,
propyldibutylheptadecylammonium,
propyldibutyloctadecylammonium,
propyldibutylnonadecylammonium,
allyldibutyldecylammonium,
allyldibutylundecylammonium,
allyldibutyldodecylammonium,
allyldibutyltridecylammonium,
allyldibutyltetradecylammonium,
allyldibutylpentadecylammonium,
allyldibutyhexadecylammonium,
allyldibutylheptadecylammonium,
allyldibutyloctadecylammonium,
allyldibutylnonadecylammonium,
methallyldibutyldecylammonium,
methallyldibutylundecylammonium,
methallyldibutyldodecylammonium,
methallyldibutyltridecylammonium,
methallyldibutyltetradecylammonium,
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium,
dibutylditridecylammonium,
dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C3 is replaced with O and C5 is replaced with CHOH; and tributyldecylammonium, tributylundecylammonium, tributyldodecylammonium, tributyltridecylammonium,
tributyltetradecylammonium,
tributylpentadecylammonium,
tributylhexadecylammonium,
tributylheptadecylammonium,
tributyloctadecylammonium,
tributylnonadecylammonium,
tripentyldecylammonium, tripentylundecylammonium,
tripentyldodecylammonium,
tripentyltridecylammonium,
tripentyltetradecylammonium,
tripentylpentadecylammonium,
tripentylhexadecylammonium,
tripentylheptadecylammonium,
tripentyloctadecylammonium,
tripentylnonadecylammonium,
propyldibutyldecylammonium,
propyldibutylundecylammonium,
propyldibutyldodecylammonium,
propyldibutyltridecylammonium,
propyldibutyltetradecylammonium,
propyldibutylpentadecylammonium, propyldibutylhexadecylammonium
propyldibutylheptadecylammonium,
propyldibutyloctadecylammonium,
propyldibutylnonadecylammonium,
allyldibutyldecylammonium,
allyldibutylundecylammonium,
allyldibutyldodecylammonium,
allyldibutyltridecylammonium,
allyldibutyltetradecylammonium,
allyldibutylpentadecylammonium,
allyldibutyhexadecylammonium,
allyldibutylheptadecylammonium,
allyldibutyloctadecylammonium,
allyldibutylnonadecylammonium,
methallyldibutyldecylammonium, methallyldibutylundecylammonium,
methallyldibutyldodecylammonium,
methallyldibutyltridecylammonium, methallyldibutyltetradecylammonium
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium,
dibutylditridecylammonium,
dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C9 and C10 are replaced with CH=CH.

Also suitable are phosphonium compounds corresponding to these ammonium compounds. Finally, mixtures of such onium compounds are suitable or in many cases preferred for use with the present invention. A number of other examples have been disclosed and described in U.S. Pat. Nos. 5,460,728 and 5,648,575 and such compounds can also be used with the present invention.

Additives suitable for reducing the toxicity of the onium compounds include, but are not necessarily limited to, aromatic carboxylic acids, sulfonic acids, organophosphonic acids, phenolic compounds, ether sulfates, phosphoric acid esters, sulfonated fatty acids, sulfated fatty acids, oligocarboxylic acids, and mixtures thereof, and alkali metal salts of these compounds and amine salts of these compounds. Particularly preferred additives are aromatic carboxylic acids, sulfonic acids, mixtures thereof and alkali metal and/or amine salts thereof. As non-limiting examples, sodium and potassium salts of these various compounds are suitable additives, as are amine salts thereof, e.g. monoethanolamine (MEA) salts. In one non-limiting embodiment of the invention, the carbon number of the additive ranges from about 1 to about 50, preferably from about 1 to about 25.

Examples of particular carboxylic acids include, but are not necessarily limited to, naphthenic acid, oleic acid, stearic acid, lauric acid, octanoic acid, benzoic acid, and mixtures thereof.

Examples of particular sulfonic acids include, but are not necessarily limited to, p-toluenesulfonic acid (p-TSA), dodecylbenzenesulfonic acid (DDBSA), benzene sulfonic acid, naphthalene sulfonic acid, and mixtures thereof.

Examples of particular organophosphonic acids include those of the formula $RPO_3H$, examples of particular ether sulfates include those of the formula $ROSO_3H$, and examples of particular phosphoric acid esters include those of the formula $ROPO_3H$, where R is a straight or branched alkyl group containing 1 to 50 carbon atoms, preferably 5 to 25 carbon atoms, and mixtures thereof, although it will be appreciated that the invention is not necessarily limited to these compounds.

Examples of particular phenolic compounds include those of the formula ArOH where Ar represents one or more aromatic rings unsubstituted or substituted with groups of the definition R given above. Specific examples of particular compounds in this group include, but are not necessarily limited to, nonylphenol, butylphenol, octylphenol, dodecylphenol, and mixtures thereof.

Examples of particular sulfonated or sulfated fatty acids include, but are not limited to, sulfonated or sulfated oleic acid, sulfonated or sulfated linoleic acid, and mixtures thereof.

Examples of particular oligocarboxylic acids include, but are not necessarily limited to, homooligomers or cooligomers of acrylic acid, methacrylic acid, maleic acid, fumaric acid, etc., where the homopolymers of carboxylic acids have very low molecular weight ($M_n$ ranges from about 100 to 200), copolymers of these carboxylic acids with nonionic comonomers such as vinylpyrrolidone, styrene, and/or alpha-olefins, where the copolymers range in molecular weight ($M_n$) from about 200 to about 100,000, and mixtures thereof.

The reaction products, complexes, or ion pairs of the onium compound with the additives of this invention should be soluble in a non-aqueous phase, whether already present in the aqueous solution, or created by introducing the additive into the aqueous solution. The additives may be added to the onium compound either downhole or on the surface (or top side for offshore hydrocarbon recovery) to effect detoxification. No solids (such as clays or lignosulfonates) are employed in the inventive method, which simplifies handling and mixing. In one non-limiting embodiment of the invention, the presence of crude oil or condensate as an organic liquid phase is preferred since it facilitates partitioning of the quaternary ammonium compound or other onium compound out of the aqueous phase and into the organic phase.

It will be appreciated that it is difficult to accurately predict in advance the necessary amounts of additive necessary to effectively reduce the toxicity of the onium compounds. Indeed, in one non-limiting embodiment of the invention, any reduction in toxicity will be understood as successful practice of the invention. There are a number of complex, interrelated factors that will affect the desired proportion of additive used in any given situation including, but not necessarily limited to, the nature and proportion of the onium compound, the nature and proportion of the hydrocarbon in the system being treated, the temperature of the system being treated, the particular additive being considered, etc. Nevertheless, to give some indication of the expected effective proportions of the additive, in one non-limiting embodiment, the proportion of additive may range from about 10:1 to about 1:10 in weight ratio with the onium compound, preferably in a weight ratio of from about 1:1 to about 1:5.

The invention will be further illustrated with reference to actual examples that are not intended to limit the invention, but rather to more completely describe it.

EXAMPLES 1–4

A brine solution comprising 97.50 g of water and 2.50 g of sodium chloride was dosed with 1.52 g of a methanolic solution of a quat (solution contains 33% methanol and 67% RE 4136 quaternary ammonium compound available from Baker Petrolite). A 90 ml sample of the water, sodium chloride, quat solution was shaken by hand for 1 minute with 10 ml of heptane. The mixture is centrifuged to separate the layers and the water layer was analyzed for quat. The above test was repeated but in this case the sample was dosed with 1.00 g of dodecylbenzenesulfonic acid (DDBSA) or 0.90 g of oleic acid (as indicated) before the addition of heptane and shaken by hand. These two cases required prolonged centrifugation to separate the phases. Again, the water phase was analyzed for quat. The data are summarized in Table I below. The quat concentration is expressed in ppm of methanolic quat solution.

TABLE I

| Ex. | Treatment | ppm of methanolic quat solution in water |
| --- | --- | --- |
| 1 | None | 15,000 |
| 2 | Heptane only | 15,000 |
| 3 | DDBSA | 76 |
| 4 | Oleic acid | 121 |

EXAMPLES 5–6

In a second set of tests, a 90 ml sample of the above water, sodium chloride and quat solution was dosed with 0.45 g of para-toluenesulfonic acid (p-TSA) or 0.74 g of a mixture of naphthenic acids (as indicated). In this test, the mixture was shaken 1 minute by hand in the absence of heptane. The samples were centrifuged. An oil layer separated and remained at the top of the samples. The slightly hazy water layer was removed. The water layer was washed with 10 ml of heptane and again centrifuged. The clear water layer was analyzed for quat. The data are summarized in Table II below.

TABLE II

| Ex. | Treatment | ppm of methanolic quat solution in water |
| --- | --- | --- |
| 5 | p-TSA | 178 |
| 6 | Naphthenic acids | 92 |

EXAMPLES 7–8

In a third set of tests, a brine solution comprising 84 g of water and 16 g of sodium chloride was dosed with 1.52 g of the above quat solution. In this case, the quat separates to some extent from the brine on standing and was used immediately in the next step as a suspension. A 90 ml sample of this suspension was dosed with 0.45 g of p-TSA or 0.74 g of a mixture of naphthenic acids (as indicated). The samples were treated as above and analyzed for quat. The data are summarized in Table III below.

TABLE III

| Ex. | Treatment | ppm of methanolic quat solution in water |
| --- | --- | --- |
| 7 | p-TSA | 88 |
| 8 | Naphthenic acids | none detected |

EXAMPLES 9–10

In a fourth set of tests, a suspension of water, sodium chloride and quat solution similar to that in the third set of tests (Examples 7–8), was contacted with 4 times its volume of a crude oil from the Gulf of Mexico. The water layer was separated and analyzed for quat. A 90 ml sample of the crude oil contacted water layer was then contacted with about 0.03 g of naphthenic acid. The sample was extracted with heptane and analyzed for quat. The data are summarized in Table IV below.

TABLE IV

| Ex. | Treatment | ppm of methanolic quat solution in water |
| --- | --- | --- |
| 7 | Crude oil | 500 |
| 8 | Crude oil + naphthenic acids | 90 |

EXAMPLES 11–13

In a fifth set of tests, the toxicity of water samples similar to those in the fourth set of tests toward marine mysid shrimp was evaluated. Mysid shrimp were raised in environments containing untreated water (control group) or with water containing 3% water from Examples 7–8 treated only with crude oil (crude oil only) or with water containing 3% water from Examples 7–8 treated with crude oil and naphthenic acids. After 48 hours, the percent survival rates for the mysid shrimp are shown in Table V.

TABLE V

| Ex. | Treatment | Percent Mysid Shrimp Survival |
| --- | --- | --- |
| 11 | Control | 100 |
| 12 | Crude oil only | 40 |
| 13 | Crude oil + naphthenic acids | 100 |

The advantages of the invention over the prior art include the fact that the invention does not involve the use of solids such as clay or lignosulfonates, which gives an advantage in handling the additive. Another advantage is that spent solids do not need to be removed and disposed of. An additional advantage is that significantly higher levels of onium compounds in aqueous solution are treated than in the prior art. A further advantage is that the inventive method prefers the presence of an organic or non-aqueous phase, which tends to enhance the separation of the onium compound out of the water. The prior art generally does not address actual physical separation of the onium compound (e.g. quat) from the aqueous phase when treated with anionic compounds. It will be appreciated that once the onium compound is in the non-aqueous phase that separation may be accomplished by any well known or yet to be developed technique including, but not necessarily limited to centrifugation, gravity settling, cyclone treater, forced air flotation or separation.

Many modifications may be made in the present invention without departing from the spirit and scope thereof that are defined only by the appended claims. For example, certain components per se, or combinations of onium compounds and additives thereof other than those specifically set out herein may be found by one of routine skill in the art to be particularly advantageous. Additionally, certain proportions of additives or combinations thereof may give particular efficacy.

We claim:

1. A method of reducing the toxicity of at least one onium compound in an aqueous solution comprising adding to the aqueous solution an amount of an additive sufficient to reduce the toxicity of the onium compound, where the onium compound partitions into a non-aqueous phase; and removing the non-aqueous phase from the aqueous solution, where the additive is a compound selected from the group consisting of carboxylic acids, sulfonic acids, organophosphonic acids, phenolic compounds, ether sulfates, phosphoric acid esters, sulfonated fatty acids, sulfated fatty acids, oligocarboxylic acids, and mixtures thereof, and alkali metal salts of these compounds and amine salts of these compounds.

2. The method of claim 1 where the additive is selected from the group consisting of carboxylic acids, sulfonic acids, and mixtures thereof, alkali metal salts of these compounds and amine salts of these compounds.

3. The method of claim 1 wherein the onium compound has a structure of the following formula having a cation and an anion $Y^-$:

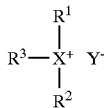

wherein
- $R^1$ and $R^2$ each are independently selected from normal or branched alkyls containing a chain of at least 4 carbon atoms, with or without one or more substituents, or one or more heteroatoms;
- $R^3$ is an organic moiety containing a chain of at least 4 carbon atoms, with or without one or more substituents, or one or more heteroatoms;
- X is S, N—$R^4$ or P—$R^4$;
- $R^4$, if present, is selected from H or an alkyl, aryl, alkylaryl, alkenylaryl or alkenyl group, preferably those having from about 1 to about 20 carbon atoms, with or without one or more substituents, or one or more heteroatoms; and
- $Y^-$ is selected from the group consisting of hydroxide ion ($OH^-$), halide ions, carboxylate ions, sulfate ion, organic sulfonate ions, and mixtures thereof.

4. The method of claim 1 wherein the effective amount of the additive ranges from about 10:1 to about 1:10 in weight ratio with the onium compound.

5. The method of claim 1 further comprising adding a non-aqueous phase to the aqueous solution prior to removing the non-aqueous phase from the aqueous solution.

6. The method of claim 1 where the onium compound and the additive are added to the aqueous solution together.

7. A method of reducing the toxicity of at least one onium compound in an aqueous solution comprising
- adding the aqueous solution an amount of an additive sufficient to reduce the toxicity of the onium compound, where the onium compound partitions into a non-aqueous phase;
- adding a non-aqueous phase to the aqueous solution before, during or after the additive is added to the aqueous solution; and
- removing the non-aqueous phase from the aqueous solution,
- where the additive is a compound selected from the group consisting of carboxylic acids, sulfonic acids, organophosphonic acids, phenolic compounds, ether sulfates, phosphoric acid esters, sulfonated fatty acids, sulfated fatty acids, oligocarboxylic acids, and mixtures thereof, and alkali metal salts of these compounds and amine salts of these compounds; and
- where the onium compound has a structure of the following formula having a cation and an anion $Y^-$:

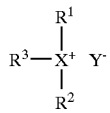

wherein
- $R^1$ and $R^2$ each are independently selected from normal or branched alkyls containing a chain of at least 4 carbon atoms, with or without one or more substituents, or one or more heteroatoms;
- $R^3$ is an organic moiety containing a chain of at least 4 carbon atoms, with or without one or more substituents, or one or more heteroatoms;
- X is S, N—$R^4$ or P—$R^4$;
- $R^4$, if present, is selected from H or an alkyl, aryl, alkylaryl, alkenylaryl or alkenyl group, preferably those having from about 1 to about 20 carbon atoms, with or without one or more substituents, or one or more heteroatoms; and
- $Y^-$ is selected from the group consisting of hydroxide ion ($OH^-$), halide ions, carboxylate ions, sulfate ion, organic sulfonate ions, and mixtures thereof.

8. The method of claim 7 wherein the effective amount of the additive ranges from about 10:1 to about 1:10 in weight ratio with the onium compound.

9. The method of claim 7 wherein the additive is selected from the group consisting of carboxylic acids, sulfonic acids, and mixtures thereof, alkali metal salts of these compounds and amine salts of these compounds.

10. The method of claim 7 where the onium compound and the additive are added to the aqueous solution together.

* * * * *

UNITED STATES PATENT AND TRADEMARK OFFICE
CERTIFICATE OF CORRECTION

PATENT NO. : 6,723,249 B2
DATED : April 20, 2004
INVENTOR(S) : Gordon T. Rivers and Hartley H. Downs It is certified that error appears in the above-identified patent and that said Letters Patent is hereby corrected as shown below:

Column 2,
Line 37, insert -- . -- after "water" and before "aqueous".

Column 3,
Line 49, delete "$(SO_4^-)$" and insert -- $(SO_4^=)$ --.

Column 15,
Line 37, insert -- to -- after "adding" and before "the".

Signed and Sealed this

Fourteenth Day of February, 2006

JON W. DUDAS
*Director of the United States Patent and Trademark Office*